Oct. 2, 1923.
G. RIVETTA
1,469,485
MAGAZINE BOX FOR CINEMATOGRAPHIC OR PHOTOGRAPHIC APPARATUS
Filed April 15, 1921
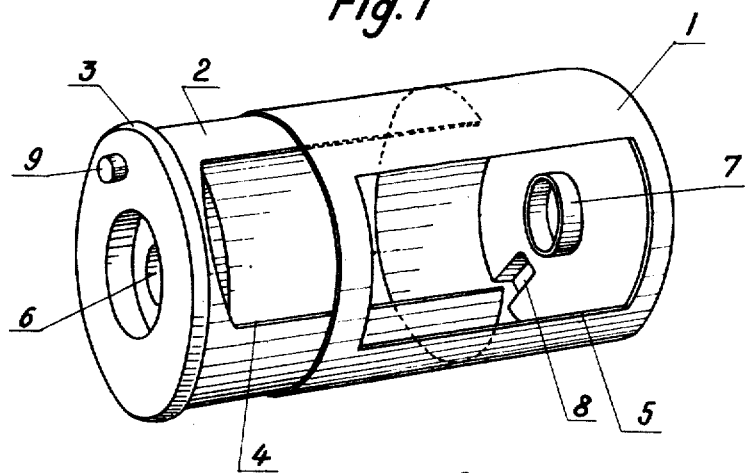
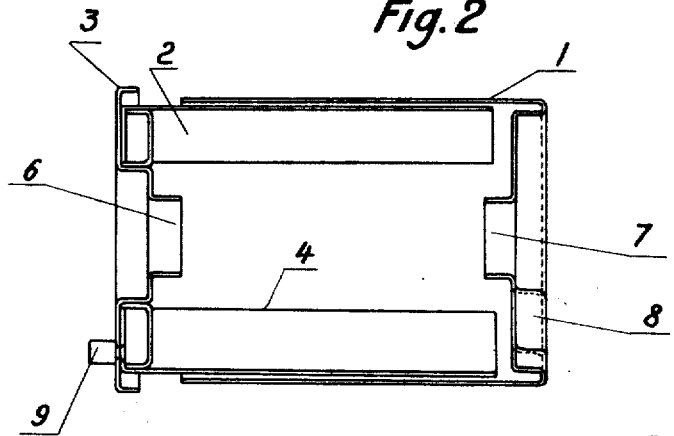
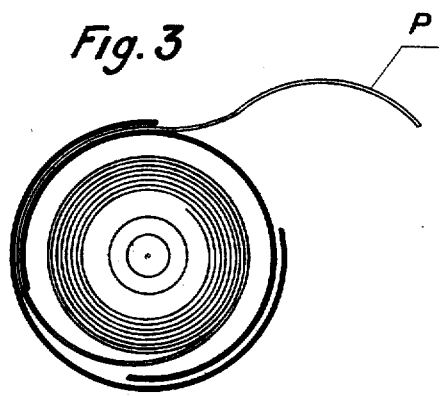

Patented Oct. 2, 1923.

1,469,485

UNITED STATES PATENT OFFICE.

GIOVANNI RIVETTA, OF PARIS, FRANCE, ASSIGNOR TO SEPT CINEMA CAMERA DISTRIBUTORS, INC., OF NEW YORK, N. Y., A CORPORATION OF NEW YORK.

MAGAZINE BOX FOR CINEMATOGRAPHIC OR PHOTOGRAPHIC APPARATUS.

Application filed April 15, 1921. Serial No. 461,496.

*To all whom it may concern:*

Be it known that I, GIOVANNI RIVETTA, subject of the King of Italy, residing at Paris, France, have invented certain new and useful Improvements in Magazine Boxes for Cinematographic or Photographic Apparatus, of which the following is a specification.

This invention relates to a container for photographic or like films and more particularly to that type of apparatus in which a material, sensitive to light, has to be inserted or removed in daylight.

Hitherto, in order to permit films for photographic or cinematographic apparatus to be introduced into the apparatus in daylight, the films were enclosed in a casing or wound on spools together with a sheet of black paper or other material adapted to prevent the passage of light.

In cinematograph magazine boxes a velvet lined slot is provided through which the film issues. The velvet lining is indispensable in order to prevent light from passing into the box through the slot but it involves the serious drawback that dust will accumulate in the velvet and scratch the film.

The process of winding up a film together with a paper strip in photographic apparatus, is unsatisfactory because it is unreliable and doubles the space required by the film, since a strip of black paper approximately as thick as the film has to be used.

According to this invention, the container is characterized by two cylindrical casings adapted to slide one within the other and provided on their circumferential surfaces with openings of such a length and width that when the two openings are in register the film can be freely wound in or out without coming into contact with the edges of the openings.

In the accompanying drawings:

Figure 1 is a view of the container in perspective, the two cylindrical casings being slightly separated from each other for the sake of clearness.

Figure 2 is a longitudinal section, and

Figure 3 is a transverse section of the container in the closed position, showing how the film is placed therein.

The container comprises two cylindrical casings, 1—2 adapted to slide one within the other. The casings are equal in height and each of them has in its circumference an opening 4—5 of sufficient height and width to permit, when the two openings are in register, of the film being wound in or out without coming into contact with the edges of the openings. A flange 3 is provided on the casing 2 for engaging the rim of the casing 1. The diameters of 1 and 2 are so designed as to permit the film to project out of the box (Figure 3). In the end of each casing an opening 6 and 7 is formed to allow a spindle to pass through, the edges of this opening being arranged to form a light-tight joint with the hub or core on which the film is wound.

A recess 8 is provided in casing 1 to ensure that the whole can be placed in a predetermined position.

The delivery box containing the blank film is closed in such a way as to cause the box opening to be closed by the walls of the casings 1 and 2, the two slots 4—5 being in diametrically opposite positions as seen in Figure 3. Once the apparatus has been closed, the container can be opened by means of a stud 9 provided outside, and by the same means the receiving box be closed after the film has been exposed and before the container is opened. The delivery box being empty, will serve in its turn as the receiving box.

What I claim is:

1. A magazine box for cinematographic and photographic apparatus, comprising two cylindrical members arranged concentrically in spaced relation, and for rotation one upon the other and each having an opening of such width as to enable the portions of the film passing through said openings to be arranged in arcs of such radius that when rolling and unrolling the bobbins the film does not come into contact with the edges of the openings.

2. A magazine box for cinematographic and photographic apparatus, comprising two cylindrical members arranged concentrically in spaced relation, and for rotation one upon the other and each having an opening of such width as to enable the portions of the film passing through said openings to be arranged in arcs of such radius that when rolling and unrolling the bobbins the film does not come into contact with the edges of the openings, a button on one of the said members to make it turn with relation to the other member and to arrange the openings in exact coincidence, the other member having a recess to facilitate the arrangement of said members in predetermined relation.

In testimony whereof I have affixed my signature.

ING. GIOVANNI RIVETTA.